United States Patent [19]
Powell, Jr.

[11] Patent Number: 5,345,748
[45] Date of Patent: Sep. 13, 1994

[54] BAGGER WITH PLURAL WEIGH CHUTES

[75] Inventor: Harry C. Powell, Jr., Faber, Va.

[73] Assignee: Powell Machinery, Inc., Faber, Va.

[21] Appl. No.: 53,482

[22] Filed: Apr. 28, 1993

[51] Int. Cl.$^5$ .......................... B65B 1/32; B65B 57/00
[52] U.S. Cl. ........................................ 53/502; 53/244; 53/475
[58] Field of Search ............... 53/501, 502, 495, 443, 53/475, 473, 244

[56] References Cited

U.S. PATENT DOCUMENTS

| | | | |
|---|---|---|---|
| 3,416,619 | 12/1968 | McClusky | 53/502 X |
| 3,705,475 | 12/1972 | Riley | 53/502 X |
| 3,913,691 | 10/1975 | Powell, Jr. | 177/202 |
| 3,977,483 | 8/1976 | Greanias | 53/502 X |
| 4,177,621 | 12/1979 | Powell, Jr. | 53/468 |
| 4,428,179 | 1/1984 | Jordan et al. | 53/502 |
| 5,174,094 | 12/1992 | Powell, Jr. | 53/469 |

Primary Examiner—James F. Coan
Attorney, Agent, or Firm—Nixon & Vanderhye

[57] ABSTRACT

A bagger for fruit or other discrete articles ensures that the bag has a minimum weight of fruit but with the lowest overage practical. A weigh pan is fed by a first conveyor having a number of singulating lanes, with an individual weigh chute at the end of each lane. The conveyor is controlled to stop filling the pan once a certain number of articles (sensed by photosensors) have passed into the pan which is less than the expected number of articles which will meet the minimum weight of articles to be bagged. Then the individual weigh chutes are loaded with one article each, and the individual or combinations of weights of one or more articles from the weigh chutes are calculated. The desired individual combination is selected which causes the weight of articles in the pan to exceed the predetermined weight by the lowest amount, and that desired individual or combination of articles is fed to the pan, the weight is confirmed in the pan, then the pan tilted to discharge the articles. A second conveyor feeds the first conveyor, and a shunt is provided to divert all, none, or some articles from the second conveyor to the first conveyor.

23 Claims, 8 Drawing Sheets

BAGGER WITH PLURAL WEIGH CHUTES

BACKGROUND AND SUMMARY OF THE INVENTION

As long as there have been automatic baggers, the goal of designers of them has been to collect and bag at least a predetermined weight of fruit or other discrete articles to be bagged, but exceeding the predetermined weight, by the smallest amount possible. Small savings per bag translate into large yearly savings. For example in equipment for forming three pound bags of apples, with fruit of a size between 4 to 6 oz., a savings of as small an amount as 1.5 oz. per bag can result in yearly savings in the tens of thousands of dollars per bagger. However the bagging operation must not be slowed considerably in order to effect these savings, and the equipment for bagging must be cost effective considering these savings.

According to the present invention, a method and apparatus are provided which are able to minimize the amount of overage of fruit or other discrete articles during collecting, bagging, and like operations, in an inexpensive, cost effective manner. For example the primary equipment utilized to perform the automatic bagging function according to the invention need only be about six feet long, and costs only about $15,000 in 1993 U.S. dollars, providing an enormous space requirement reduction compared to many competitive automatic baggers, and being of substantially less cost. Yet the bagging and collecting method and apparatus according to the invention are able to save significant amounts of money by minimizing the overage in bags of articles produced (while still ensuring that the articles weigh more than a predetermined amount). For example, the method and apparatus according to the invention are able to save about 1.5 oz. for a three pound bag of apples with fruit size between 4 to 6 oz., compared to the most effective prior art commercial equipment. Despite these advantages the apparatus according to the present invention is simple and compact, with no difficulty to construct or maintain components.

The basic apparatus according to the present invention that allows it to achieve the desirable results set forth above include a number of individual weighing devices, referred to as "weigh chutes" which are associated with a first conveyor for feeding articles to an essentially conventional primary weighing pan. Preferably the articles are singulated to the weigh chutes by the conveyor. Also, associated with the automatic bagger according to the invention is a shunt device for diverting fruit being conveyed by a second conveyor, which conveys the fruit or other articles in a second direction transverse to the direction of conveyance of the first conveyor. The shunt is controlled by a pair of fluid cylinders to provide either no flow, maximum flow, or an intermediate flow, of articles being conveyed by the second conveyor to the first conveyor.

According to one aspect of the present invention, a bagger for discrete articles, such as apples or other pieces of fruit, is provided. The bagger comprises the following elements: A primary weigh pan for weighing articles fed thereto, and upon the articles therein exceeding a predetermined weight, discharging the articles. First conveying means for delivering articles to the primary weigh pan, the first conveying means including a plurality of discharge structures, the discharge structures immediately adjacent the primary weigh pan. Each of the discharge structure comprising a weigh device (chute), and a releasable stop finger for releasably holding an article in the weigh device, each weigh device large enough to receive one of the articles therein. And, control means for: activating the fingers for holding articles in the weigh devices once the primary weigh pan senses a weight of articles just short of the predetermined weight; for receiving the individual weights of the articles in the weigh devices; for calculating the desired individual or combination of article weights in the weigh devices which is the lowest weight which will cause the articles in the primary weigh pan to exceed the predetermined weight; and for activating the fingers associated with the calculated desired individual or combination of weigh devices. The control means may include a computer controlled by software to perform the desired calculations and control functions.

The first conveying means preferably comprises a plurality of lanes, one associated with each of the weigh devices, for singulating articles to the weigh devices. The control means preferably includes a plurality of sensors (e.g. photosensors), one associated with each of the lanes for sensing passage of each article along each lane. The control means typically controls the first conveying means, in response to sensing by the sensors, so that the first conveying means is arrested and the stop fingers stop articles in the weigh devices when the primary weigh pan receives the number of articles expected to provide the predetermined weight minus X, where X is a positive integer less than or equal to the number of weigh devices. Typically four lanes are provided for the first conveyor, and four weigh devices, and X then preferably equals 2.

Second conveying means are also provided for feeding articles in mass to the first conveying means, and shunt means are associated with the second conveying means for controlling the feed of articles to the first conveying means from the second conveying means. The shunt means preferably comprises a bar disposed at approximately the level of the second conveying means, and first and second fluid cylinders operatively pivotally connected to the bar for controlling the position of the bar with respect to the second conveying means to either allow full feed, partial feed, or no feed of articles from the second conveying means to the first conveying means. For example the shunt means may include a crank arm rigidly connected to the bar with one of the fluid cylinders pivotally connected to the crank arm and the other pivotally connected to a stationary frame, with the fluid cylinders rigidly connected to each other. A first conveying means conveys articles in a first direction and the second conveying means conveys them in a second direction, substantially perpendicular to the first direction, the shunt means deflecting articles from the second direction to the first direction.

According to another aspect of the present invention, a method of automatically collecting at least a predetermined weight of discrete articles each having a weight significantly lower than the predetermined weight, using a plurality of individual weigh devices (chutes), and a primary collecting pan weighing device, is provided. The method comprises the steps of automatically: (a) Feeding a plurality of articles past the individual weigh devices until a number of articles having a collective weight just below the predetermined weight enter the collecting pan. (b) After step (a), stopping further feeding of articles past the individual weigh devices, so that an article is provided in each of the weigh devices. (c) Measuring the collective weight of articles in the collecting pan and comparing it to the predetermined weight to determine a shortfall weight. (d) Determining the weights of each of the individual articles in each of the individual weigh devices. (e) Calculating the desired individual or combination of individual articles from the weigh devices that is the closest to, yet exceeds, the shortfall weight. (f) Releasing only the individual article or articles from the individual weigh devices having articles which comply with the desired individual or combination of step (e), so that it or they enter the collecting pan. And, (g) discharging the articles with a collective weight approximately at, but exceeding, the predetermined weight from the collecting pan.

The method described above may be practiced in at least three different ways, in each case step (a) being practiced to count the number of articles fed to the collecting pan. Step (b) may be practiced to stop the feed of articles to the collecting pan once the number of articles fed to the pan is the same as the number of articles in the pan when step (g) was practiced for the most recent previous pan, minus X (the whole integer described above, e.g. for a four lane conveyor). Alternatively, step (b) may be practiced to stop the feed of articles to the collecting pan once the number of articles fed to the pan is the average of the number of articles in the pan when step (g) was practiced for the several most recent previous pans, minus X. In still another alternative, step (b) may be practiced to stop the feed of articles to the collecting pan when a number of articles times the average weight of articles minus X has passed into the pan, in which case the average weight of the articles is calculated. Normally the articles are pieces of fruit, and there is the further step of bagging the articles discharged in step (g) with conventional. bagging equipment, such as shown in U.S. Pat. Nos. 4,177,621 or 5,174,094, the disclosures of which are hereby incorporated by reference herein.

It is the primary object of the present invention to provide for the efficient and effective automatic collection and bagging of discrete articles so that there is a minimum amount of overage in each bag, and in a substantially continuous manner. This and other objects of the invention will become clear from an inspection of the detailed description of the invention and from the appended claims.

DETAILED DESCRIPTION OF THE DRAWINGS

Figure 1:
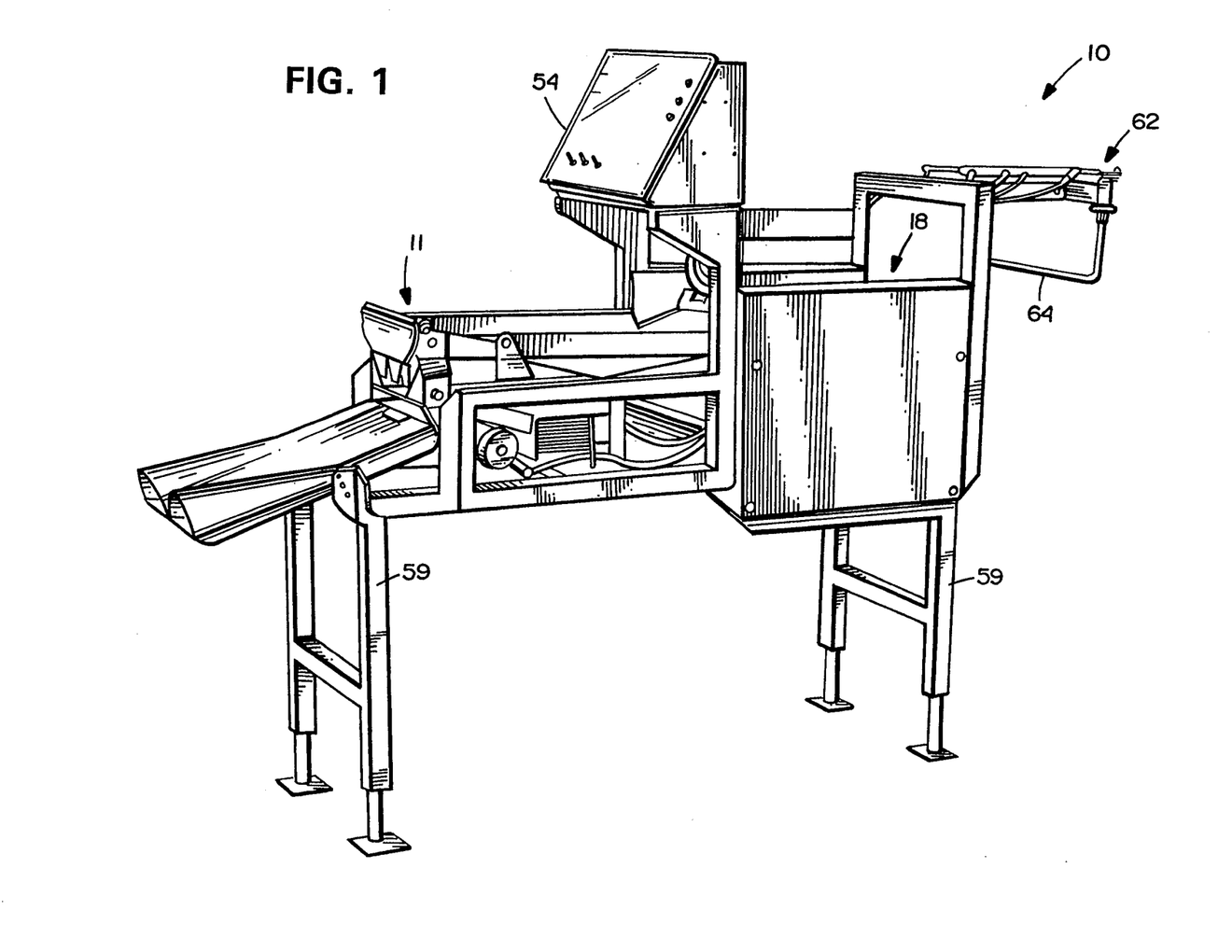
FIG. 1 is a top perspective view of an exemplary automatic bagger according to the present invention.

FIG. 1 illustrates an exemplary automatic bagger 10 according to the present invention. The function of the automatic bagger 10 is to collect and weigh pieces of fruit (such as apples) or other discrete articles to be bagged, so that they are ready to be actually deposited in a machine which actually places the apples in a bag and ties the bag. The actual mechanisms for holding and tying the bag are not part of the present invention, and may, for example, be like those shown in U.S. Pat. Nos. 4,177,621 and 5,174,094.

One of the main components of the automatic bagger comprises the primary weigh pan 11 (see FIGS. 1 through 3 and 7) which is per se conventional. The weigh pan 11 is connected to a conventional load cell 12 ( see FIG. 2) or the like, and is mounted for pivotal movement adjacent the discharge end 13 thereof, and is normally—see the solid line position in FIG. 2—disposed so that its feed end 14 is positioned to receive discrete articles. To discharge articles from the weigh pan 11, after the load cell 12 confirms the presence of at least a predetermined weight (e.g. three pounds) of discrete articles within the pan 11, a conventional pivoted lever arm 15 with a roller 16 for engaging the bottom of the weigh pan 11 is operated by a hydraulic or pneumatic cylinder 17 to move to the dotted line position in FIG. 2. The discharge end 13 of the pan 11 is adjacent the bag holding and tying equipment, such as described in the above mentioned patents.

Figure 2:
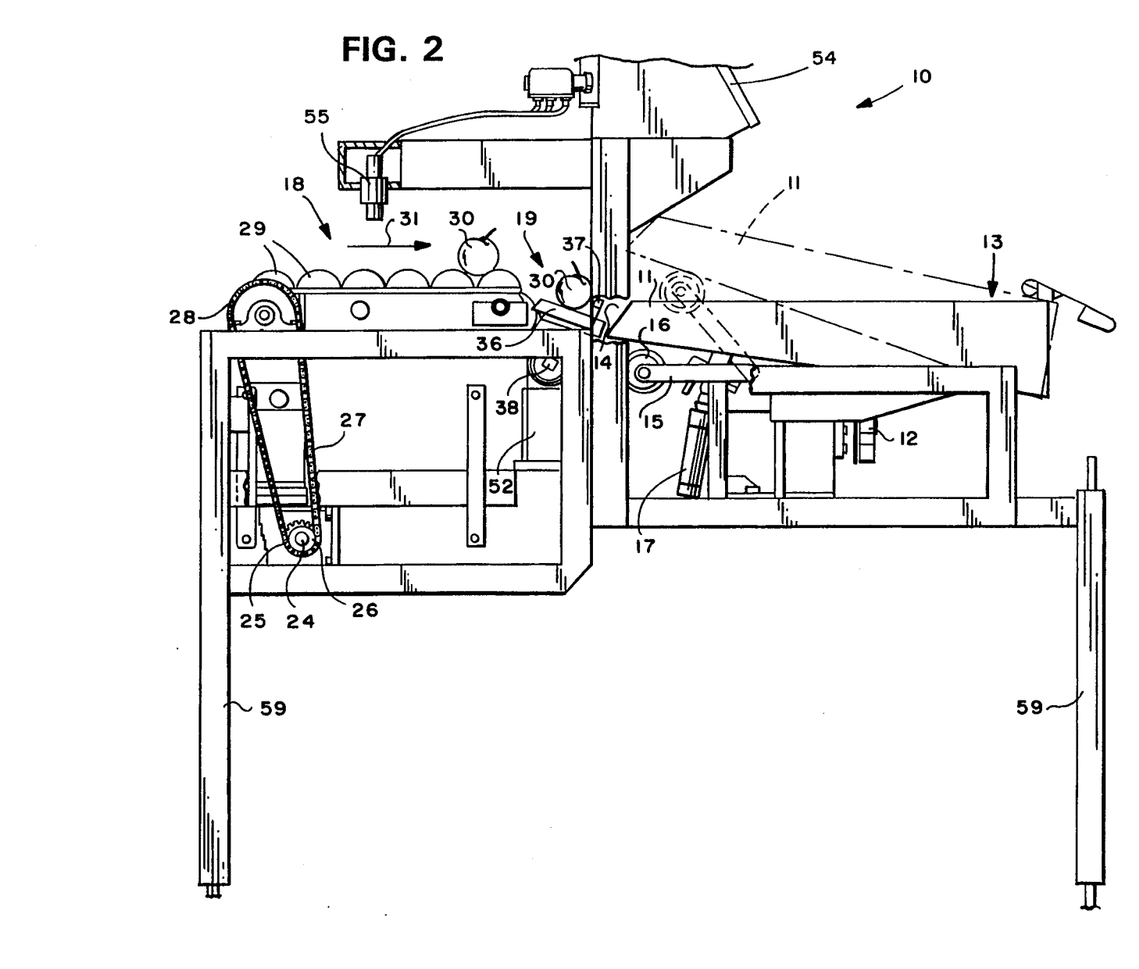
FIG. 2 is a side schematic elevational view of the bagger of FIG. 1.
Figure 7:
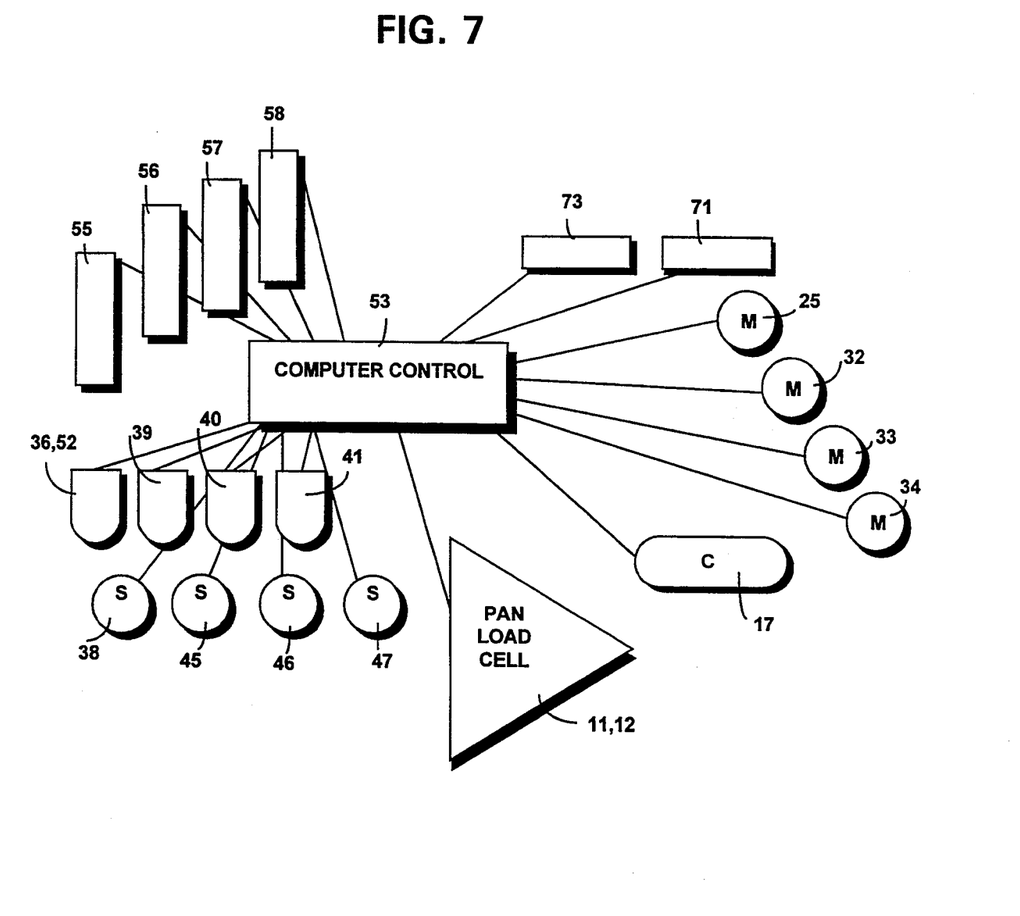
FIG. 7 is a control schematic of the apparatus of FIGS. 1 through 6.

Novel according to the present invention is a first conveying means 18 with particular discharge structures 19 immediately adjacent the feed end 14 of the pan 11. The horizontal portions of the first conveying means 18 is similar to the conveyor illustrated in U.S. Pat. No. 5,174,094, and preferably comprises a plurality of lanes 20–23 (see FIG. 3) each of which is individually powered by a drive mechanism, e.g. a motor. In FIG. 2, the output shaft 24 for one such motor 25 is shown connected to a sprocket 26, which drives, through a chain 27, a driven sprocket 28, which in turn powers the hourglass shaped rollers 29 associated with the lane 20, to convey fruit, such as apples 30, there along in a first direction 31. Motors like the motor 25, shown by reference numerals 32–34 in FIG. 7, are provided for each of the other lanes 21 through 23.

Figure 3:
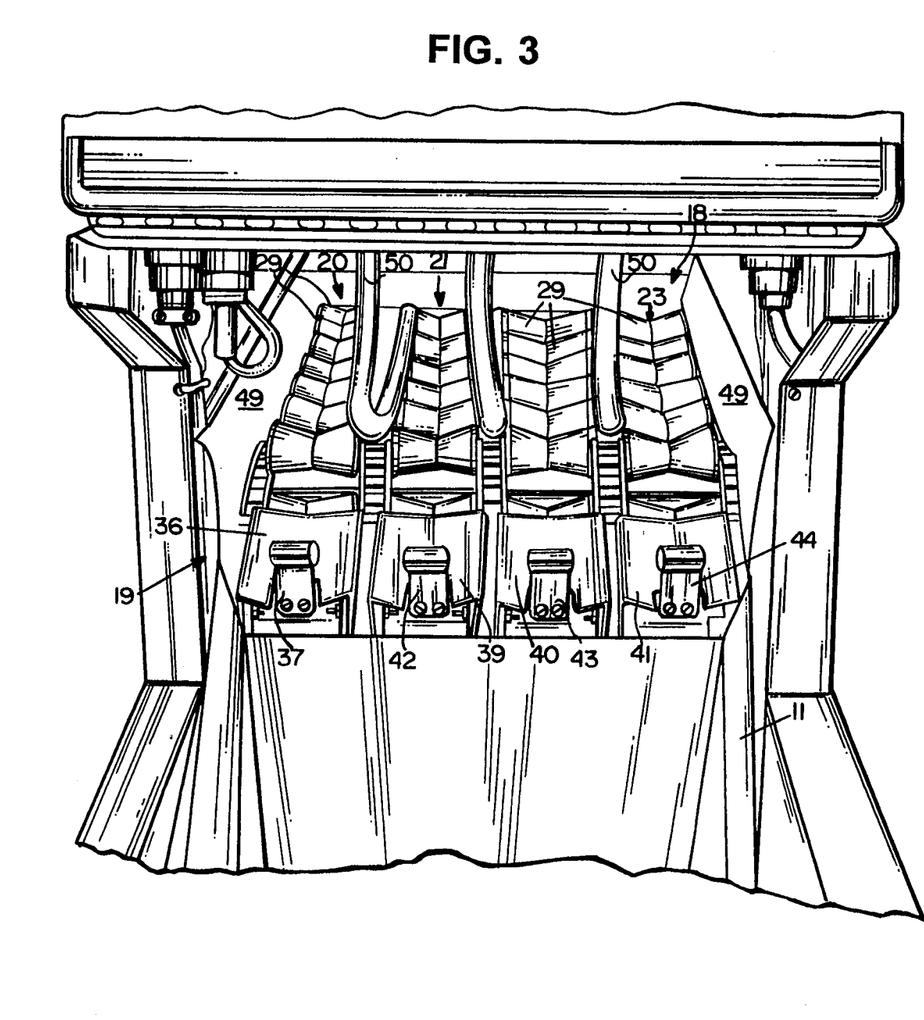
FIG. 3 is a front end view looking into the weigh chutes and lanes of the bagger of FIGS. 1 and 2.

The novel discharge structure 19 according to the present invention comprises, associated with each lane 20 through 23, a weigh device or weigh chute 36 having a stop finger 37 associated therewith, and movable between blocking and release positions by a rotary solenoid 38 (see FIGS. 2 and 7) or the like. Each chute 36 is contoured to have higher side walls than a central portion, as illustrated in FIG. 3, and is large enough to receive one of the articles 30 therein, preferably only a single one of the articles, when stop finger 37 associated therewith is moved to the blocking position illustrated in FIGS. 2 and 3. The chutes 39, 40, 41 are substantially identical to the chute 36, each having its own stop finger 42–44 (see FIG. 3), respectively, and controlled by its own solenoid 45–47 (see FIG. 7).

As also illustrated in FIG. 3 it is preferred that the first conveying means 18 include side walls 49 which are tapered so as to retain apples or other discrete articles therein, and it is preferred that each of the lanes 20–23 be separated from the lanes on the sides thereof by a rubber hose 50 (see FIG. 3) or the like. While the hoses 50 perform a separating function, and do not allow the fruit to come in contact with the drive chains extending between the rollers 29 of the various lanes 20–23, they are small enough that if an excess feed condition ensues for any lane 20–23, a piece of fruit can flow from that lane to an adjacent lane.

The lanes 20–23 singulate the articles, such as apples 30, to the weigh chutes 36, 39–41. The bottom portions of the weigh chutes 36, 39–41 are disposed—as seen in FIGS. 2 and 3—at the feed end 14 of the pan 11, and when the fingers 37, 42–44 are retracted by the solenoids 38, 45–47, the chutes 36, 39–41 merely serve as directing devices for transporting the fruit into the pan 11 to be collected therein. However, when the fingers 37, 42–44 are moved to their stop positions—as illustrated in FIGS. 2 and 3—a piece of fruit is retained in each of the chutes 36, 39–41, and weighed.

A load cell, shown only schematically at 52 in FIG. 2, is associated with each of the chutes 36, 39–41. The load cell 52 is conventional, and determines the weight of the apple 30 or other discrete article held by the chute 36. This information is fed to a control means, which preferably includes the computer 53 (see FIG. 7) which is disposed within the control panel 54 (see FIGS. 1 and 2) of the bagger 10.

The computer control 53 controls the discharge cylinder 17, the motors 25 and 32 through 34, and the solenoids 38 and 45 through 47. It receives input from the pan/load cell 11, 12, and from each of the load cells (e.g. 52) associated with the individual weigh devices 36 and 39 through 41. It also receives input from a plurality of sensors, 55–58 (see FIG. 7) which count the articles on the conveyor 18 that pass toward the weigh devices 36, 39–41.

Each of the sensors 55–58 preferably comprises a photosensor, and is mounted as illustrated for the photosensor 55 in FIG. 2, directly above one of the lanes 20–23 of the first conveyor 18. The photosensor 55 is immediately above the rollers 29 associated with the first lane 20, while the photosensors 56–58 are mounted above the second through fourth lanes 21–23, respectively. The photosensors 55–58 count the articles moving along the conveyor lanes 20–23 in the direction 31 and feed this information to the computer 53.

All of the components heretofore described are preferably mounted on a simple frame, which is clearly illustrated in FIGS. 1 through 3, and includes ground engaging legs 59. The frame is typically of metal, such as steel, and the entire length of the bagger 10 between the legs 59 (see FIGS. 1 and 2) is small compared to conventional prior art automatic baggers, e.g. only about six feet.

The bagger 10 also is preferably associated with a second conveyor which supplies apples 30 in bulk to the first conveyor 18, to be singulated and transported toward the pan 11. A second conveyor is illustrated only schematically in FIGS. 4 and 6 as a conveyor belt 60 which moves in a second direction 61 which is substantially transverse to the first direction 31. The conveyor 60 may be any suitable conventional conveyor, such as those commonly used in apple houses.

Figure 4:
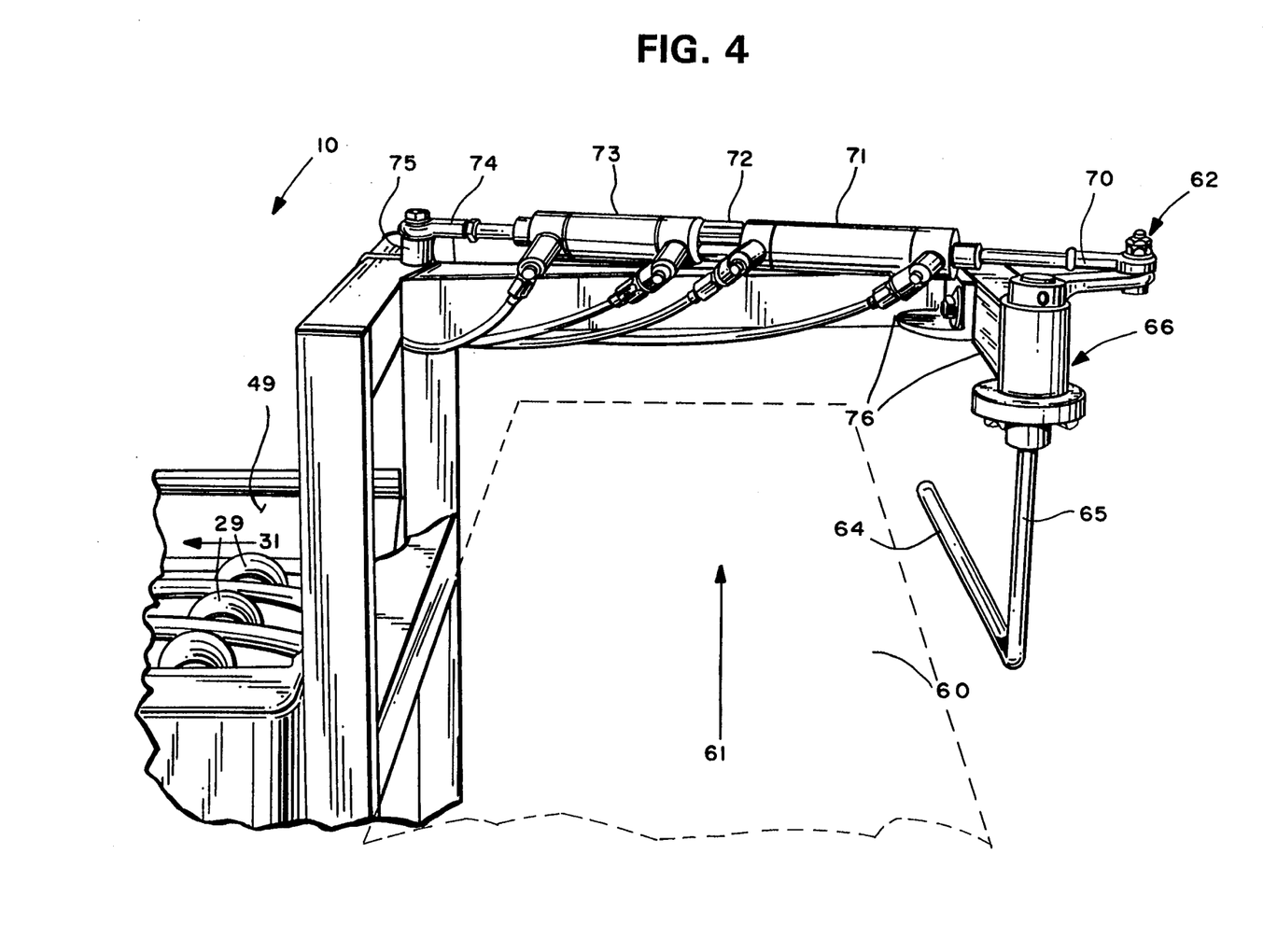
FIG. 4 is a top perspective detail view of the shunt means associated with the bagger of FIGS. 1 through 3.
Figure 5:
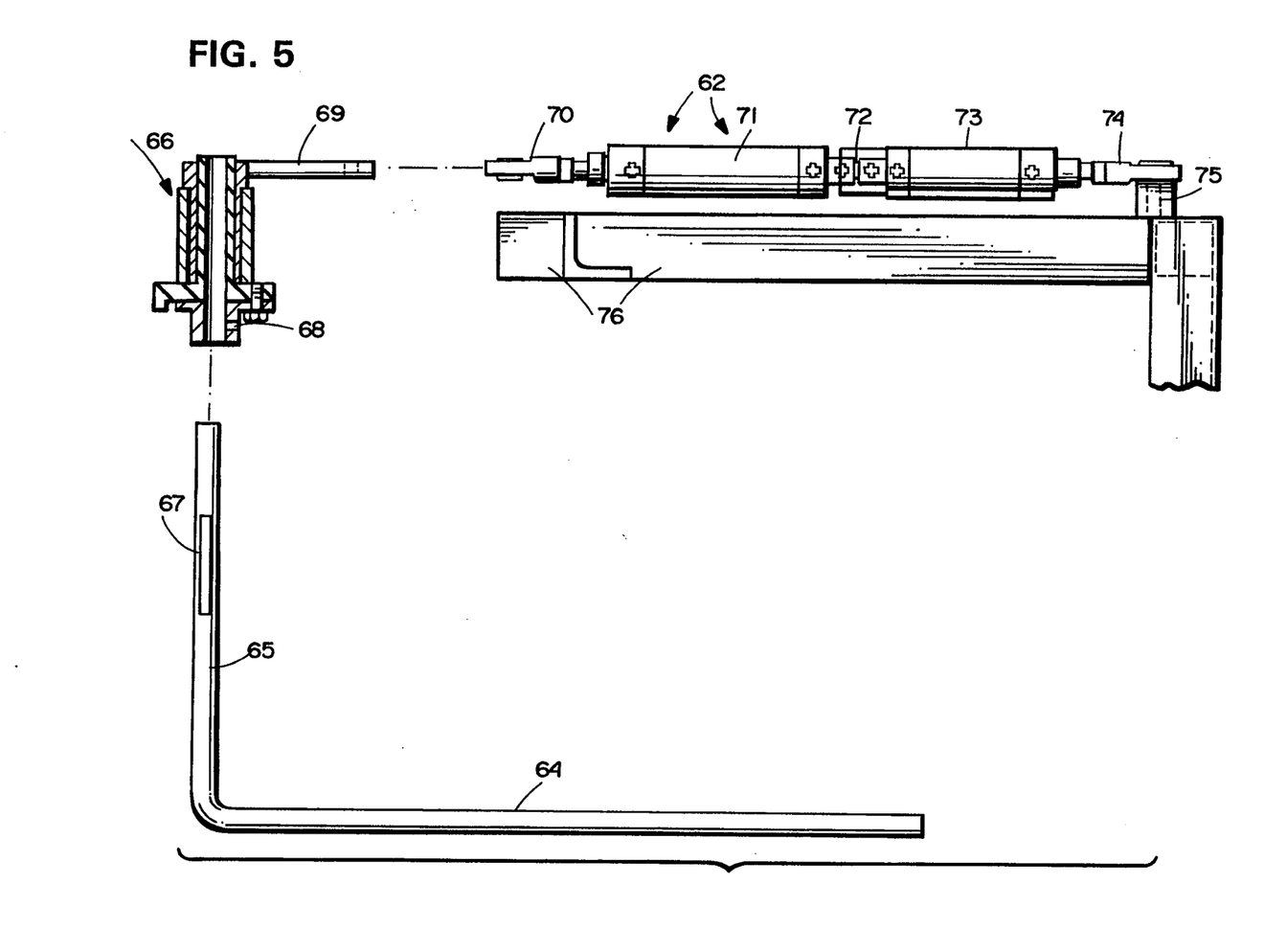
FIG. 5 is a side exploded view, partly in cross section, of the shunt means of FIG. 4.
Figure 6:
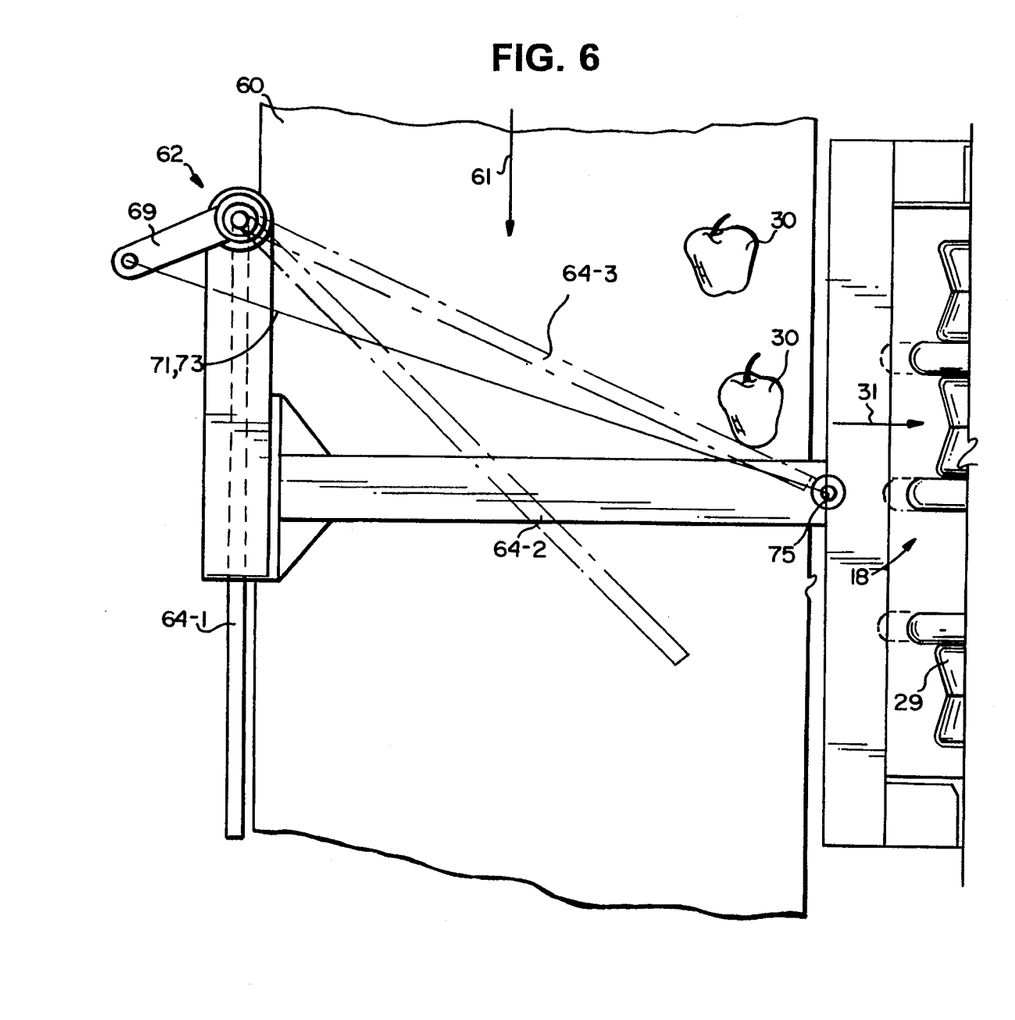
FIG. 6 is a schematic top view illustrating the shunt means of FIGS. 4 and 5 in three different positions.

According to the present invention, associated with the bagger 10 is a shunt means, shown generally by reference numeral 62 in FIGS. 4 through 6, which directs apples 30 from the conveyor 60 to the conveyor 18.

The shunt means 62 includes a metal or hard plastic shunt bar (e.g. about ½–⅜ inch in diameter) 64 which is substantially parallel to the conveyor 60 and disposed just above it, and is connected to the shunt shaft 65 which is rotatable about a substantially vertical axis, received within a bushing 66 and having a slot 67 (see FIG. 5) therein for receipt of a set screw which passes through the opening 68 in the bushing 66, and which can be tightened down to adjust the distance between the bar 64 and the bushing 66. The shunt 62 is constructed so that a bar 64 is provided rather than a plate, so that if an emergency situation occurs, the fruit can roll over the bar 64 and continue passing in the second direction 61, yet the majority of the fruit will be stopped or redirected by the bar 64, during normal operation.

Mounted at one end of the bushing 66 is a crank arm 69. The crank arm 69 is pivotally connected to the end 70 of a piston associated with a first fluid cylinder 71 (e.g. a pneumatic cylinder). The first cylinder 71 is connected, as by rigid connection 72, to a second fluid cylinder 73 having an end of the piston 74 associated therewith which is pivotally connected to a frame component 75. The bushing 66 is mounted on a stationary frame arm 76 connected to the other components of the main frame for the bagger 10.

FIG. 6 illustrates operation of the shunt means 62 according to the invention. When both cylinders 71, 73 are controlled by the computer 53 so that both piston rods are extended (see FIG. 4), the bar 64 is in the position illustrated at 64-1 in FIG. 6, where it allows free flow of apples 30 in the direction 61 without diverting any to the first conveyor 18. When the first cylinder 71 is retracted, however, then the bar 64 moves to the intermediate position illustrated at 64-2 in FIG. 6, which position it directs a substantial flow of apples 30 to the first conveyor 18, although some apples can flow therepast in the direction 61. When both cylinders 71, 73 are retracted (as illustrated in FIG. 5), the bar 64 moves to the position illustrated at 64-3 in FIG. 6, in which position essentially all of the apples 30 are directed onto the first conveyor 18.

Software in the computer 53 effects control of all of the components so as to achieve the desired result of the invention, namely providing a minimum weight overage of articles in the pan 11 with respect to the predetermined weight, prior to tilting of the pan 11 to effect bagging. With the control according to the present invention it is, for example, where the predetermined weight is three pounds and where the size of the apples being bagged is between 4–6 oz., possible to save 1.5 oz. in overage for each three pound bag compared to the prior art. A high level flow sheet illustrating the control of the components according to the invention is schematically illustrated in FIG. 8.

Figure 8:
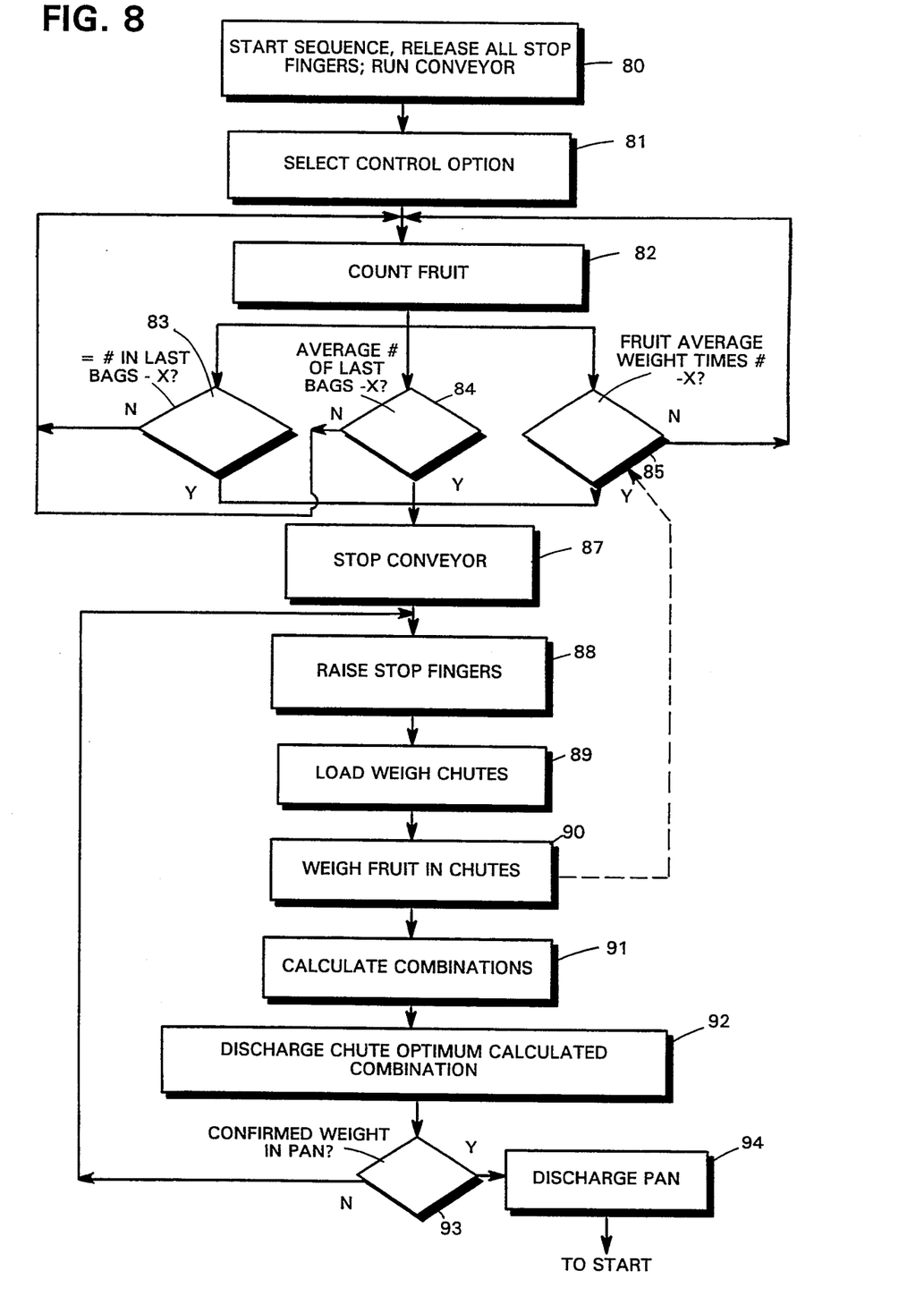
FIG. 8 is a high level flow chart illustrating operation of the apparatus of FIGS. 1 through 7.

The first box, 80, in FIG. 8, indicates a start of a collecting/weighing/bagging sequence, in which the computer 53 controls all of the stop fingers 37, 42–44 to release them so that they do not block fruit flowing along the chutes 36, 39–41 to the pan 11, by controlling the solenoids 38, 45–47. Also the motors 25, 32–34 are operated to rotate the rollers 29 and convey apples in direction 31 so that they are singulated in the lanes 20–23 and pass to the pan 11. In box 81 software selects the control option, which can be based upon previous learned history, which will be best for ensuring minimum overage for the particular fruit and predetermined weight involved, or a control sequence can be inputted by the operator utilizing controls on control panel 54. The fruit is counted as indicated in box 82, by the photosensors 55–58, and then the procedure utilizes one of three alternative decision blocks 83–85.

In decision block 83, the number of fruit counted at 81 is compared to the number of fruit that was placed in the last bag (that is that was in the pan 11 when it was discharged, after being sensed by the load cell 12 to be over the predetermined weight). In the alternative block 84, instead of using the count from the very last bag, the computer 53 averages the count of articles 30 from the last several (e.g. four or five) collection/bag functions. In control block option 85, an average weight of fruit during the last collection/bagging sequence as determined by the load cells (e.g. 52) associated with the individual weigh chutes 36, 39–41, is calculated, and that is divided into the desired bag weight to determine the number of fruit that should be counted.

In each of decision blocks 83 through 85, the desired number to which the count from 82 is compared is obtained by subtracting out the whole positive integer X, which is less than or equal to the number of weigh devices 36, 39–41. In a four lane bagger 10 such as is illustrated in the drawings, the integer X is preferably 2. Preferably at least three lanes 20–23 are provided.

As schematically illustrated in FIG. 8, once the desired number of pieces of fruit has been counted at 82, as determined by one of the control blocks 83–85, the conveyor 18 is stopped as indicated at 87. Then the solenoids, 38, 45–47 are activated, as schematically illustrated at 88, to raise the stop fingers 37, 42–44. Then the individual lanes 20–23 of the conveyor 18 are operated so as to load a single additional piece of fruit into each of the chutes 36, 39–41, as illustrated at 89 in FIG. 8. Then each piece of fruit in each chute 36, 39–41 is weighed as indicated at 90, by the load cell. (e.g. 52) associated therewith. The information from these load cells is fed back to the decision block 85 to provide for the average weight calculation for the next sequence.

After block 90, the computer 53 calculates the possible combinations of weights of apples that can be fed to the pan 11. In a four lane bagger 10, as illustrated in the drawings, there will be 16 different combinations: A single apple from each of the four different chutes (4), a combination of any two chutes; (7), a combination of any three chutes (4), or all four chutes (1; 4+7+4+1=16). As indicated at block 91 these calculations are made, and then the combination is selected which—when summed the weight in the pan 11 that already exists (as measured by the load cell 12)—will exceed the predetermined weight, but will exceed the predetermined weight by the lowest possible amount. Then, as indicated at block 92, the fingers 37, 42–44 associated with that chute or those chutes are lowered by the solenoids 38, 45–47 to allow one or more: pieces of fruit 30 to roll into the pan 11. For example, if the calculation from block 91 determines that the apples from chutes 36, 42, and 44 will bring the weight of articles in the pan 11 to just one ounce above the predetermined weight of three pounds, while all other combinations either do not reach the predetermined weight of three pounds or exceed it by more than one ounce, then the fingers 37, 42 and 4.4 are activated by the solenoids 38, 46, and 47 to allow those pieces of fruit to roll into the pan 11.

After block 92, according to decision block 93 in FIG. 8, the weight in the pan 11 is confirmed. If it is confirmed by the load cell 12 that the weight of articles in the pan 11 is above the predetermined weight, e.g. three pounds, then—as indicated at block 94—the cylinder 17 is operated to tilt the pan 11 upwardly and discharge the apples from the pan (dotted line in FIG. 1). If the weight is not confirmed to be over the predetermined weight, then the sequence is repeated starting at block 88. Once the pan 11 has been tilted as indicated at block 94, the sequence starts again, back to block 80.

It is also noted, although not illustrated in the control sequence in FIG. 8, that the computer 53 will control the cylinders 71, 73 to ensure that there is a sufficient flow of apples past the photosensors 55, 58 to meet the requirements of the bagger 10.

It will thus be seen that according to the present invention a method and apparatus for collecting and bagging discrete articles, having a predetermined collective weight, have been provided which are efficient and effective. While the invention has been herein shown in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent apparatus and methods.

What is claimed is:

1. An automatic bagger for discrete articles, comprising:

a primary weigh pan for weighing articles fed thereto, and upon the articles therein exceeding a predetermined weight, discharging the articles;

first conveying means for delivering articles to said primary weigh pan, said first conveying means including a plurality of discharge structures, said discharge structures immediately adjacent said primary weigh pan;

each said discharge structures comprising a weigh device, and a releasable stop finger for releasably holding an article in said weigh device, each weigh device large enough to receive one of the articles therein; and control means for: activating said fingers for holding articles in said weigh devices once said primary weigh pan senses a weight of articles just short of said predetermined weight; for receiving the individual weights of said articles in said weigh devices; for calculating the desired individual or combination of article weights in said weigh devices which is the lowest weight which will cause the articles in said primary weigh pan to exceed said predetermined weight; and for activating said fingers associated with said calculated desired individual or combination of weigh devices.

2. A bagger as recited in claim 1 wherein said first conveying means further comprises a plurality of lanes, one associated with each of said weigh devices, for singulating articles to said weigh devices.

3. A bagger as recited in claim 2 wherein said control means further comprises a plurality of sensors, one associated with each of said lanes, for sensing passage of each article along each lane.

4. A bagger as recited in claim 3 wherein said control means further comprises means for controlling said first conveying means, in response to sensing by said sensors, so that said first conveying means is arrested and said stop fingers stop articles in said weigh devices when said primary weigh pan receives the number of articles expected to provide said predetermined weight minus X, where X is a positive integer less than or equal to the number of weigh devices.

5. A bagger as recited in claim 3 wherein said sensors comprise photosensors.

6. A bagger as recited in claim 2 further comprising second conveying means for feeding articles in mass to said first conveying means, and shunt means associated with said second conveying means for controlling the feed of articles to said first conveying means from said second conveying means.

7. A bagger as recited in claim 6 wherein said shunt means comprises a substantially rigid bar disposed at approximately the level of said second conveying means, and first and second fluid cylinders operatively pivotally connected to said bar for controlling the position of said bar with respect to said second conveying means to either allow full feed, partial feed, or no feed of articles from said second conveying means to said first conveying means.

8. A bagger as recited in claim 7 wherein said shunt means further comprises a crank arm rigidly connected to said bar, one of said fluid cylinders pivotally connected to said crank arm, the other of said cylinders pivotally connected to a stationary frame, and said fluid cylinders rigidly connected to each other.

9. A bagger as recited in claim 6 wherein said conveying means conveys articles in a first direction, and wherein said second conveying means conveys articles in a second direction, substantially perpendicular to said first direction, said shunt means for deflecting articles from said second direction to said first direction.

10. A bagger as recited in claim 1 wherein said control means further comprise solenoids for controlling said releasable stop fingers.

11. A bagger as recited in claim 1 wherein said primary weigh pan has a feed end, and a discharge end; and further comprising a bag filling device operatively connected to the discharge end of said primary weigh pan.

12. A bagger as recited in claim 3 wherein the total length of said first conveying means and said primary weigh pan is about six feet.

13. A bagger as recited in claim 3 wherein each lane of said first conveying means comprises a plurality of substantially hourglass shaped rollers mounted for rotation and rotated about substantially horizontal axes, each weigh device located at a discharge end of and slightly below said rollers of the lane associated therewith.

14. A bagger as recited in claim 1 wherein said first conveying means comprises four lanes, and four weigh devices.

15. A method of automatically collecting at least a predetermined weight of discrete articles each having a weight significantly lower than said predetermined weight, using a plurality of individual weigh devices, and a primary collecting pan weighing device, comprising the steps of automatically:

(a) feeding a plurality of articles past the individual weigh devices until a number of articles having a collective weight just below said predetermined weight enter the collecting pan;

(b) after step (a), stopping further feeding of articles past the individual weigh devices, so that a single article is provided in each of the weigh devices;

(c) measuring the collective weight of articles in the collecting pan and comparing it to said predetermined weight to determine a shortfall weight;

(d) determining the weights of each of the individual articles in each of the individual weigh devices;

(e) calculating the desired individual or combination of individual articles from the weigh devices that is the closest to, yet exceeds, the shortfall weight;

(f) releasing only the individual article or articles from the individual weigh devices having articles which comply with the calculation of step (e), so that it or they enter the collecting pan; and (g) discharging the articles with a collective weight approximately at, but exceeding, said predetermined weight from the collecting pan.

16. A method as recited in claim 15 wherein step (a) is practiced to count the number of articles fed to the collecting pan, and wherein step (b) is practiced to stop feed of articles to the collecting pan once the number of articles fed to the pan is the same as the number of articles in the pan when step (g) was practiced for the most recent previous pan minus X, where X is a whole integer which is less than or equal to the number of individual weigh devices.

17. A method as recited in claim 15 wherein step (a) is practiced to count the number of articles fed to the collecting pan, and wherein step (b) is practiced to stop feed of articles to the collecting pan once the number of articles fed to the pan is the average of the number of articles in the pail when step (g) was practiced for the several most recent previous pans, minus X, where X is a whole integer which is less than or equal to the number of individual weigh devices.

18. A method as recited in claim 15 wherein step (a) is practiced to count the number of articles fed to the collecting pan, weighing a predetermined number of articles, and determining the average weight of the weighed predetermined number of articles; and wherein step (b) is practiced to stop feed of articles to the collecting pan when a number of articles times the average weight of articles minus X, where X is a whole integer which is less than or equal to the number of individual weigh devices, has passed into the pan.

19. A method as recited in claim 15 wherein the articles are pieces of fruit, and comprising the further step of bagging the articles discharged in step (g).

20. A bagger comprising:
a collecting pan having a feed end and a discharge end;
first conveying means for feeding articles in a first direction to said feed end of said pan;
second conveying means for feeding articles in a second direction, substantially transverse to said first direction, to said first conveying means; and
shunt means for selectively diverting all, none, or some of the articles being conveyed by said second conveying means to said first conveying means, said shunt means comprising a substantially rigid bar at approximately the level of said second conveying means, and first and second fluid cylinders operatively pivotally connected to said bar.

21. A bagger as recited in claim 20 wherein said shunt means further comprises a crank arm rigidly connected to said bar, one of said fluid cylinders pivotally connected to said crank arm, the other of said cylinders pivotally connected to a stationary frame, and said fluid cylinders rigidly connected to each other.

22. A bagger as recited in claim 20 wherein said first conveying means conveys articles in a first direction, and wherein said second conveying means conveys articles in a second direction, substantially perpendicular to said first direction, said shunt means for deflecting articles from said second direction to said first direction.

23. An automatic bagger for discrete articles, comprising:
- a weigh pan for weighing articles fed thereto, and upon the articles therein exceeding a predetermined weight, discharging the articles;
- a conveyor lane for conveying the articles in single file in a first direction toward the weigh pan, said conveying lane being located vertically above the weigh pan;
- a weigh chute disposed between the conveyor lane and the weigh pan for guiding the downward movement of articles from the conveyor lane to the weigh pan; and
- a releasable stop finger associated with said weigh chute, said stop finger when extended stopping a single article in the weigh chute to be weighed thereby, and when retracted allowing articles to fall freely from the conveyor lane past the weigh chute to the weigh pan.

* * * * *